July 12, 1927.
K. STAHL ET AL
GAS VALVE FOR AIRSHIPS
Filed Dec. 10, 1924
1,635,195
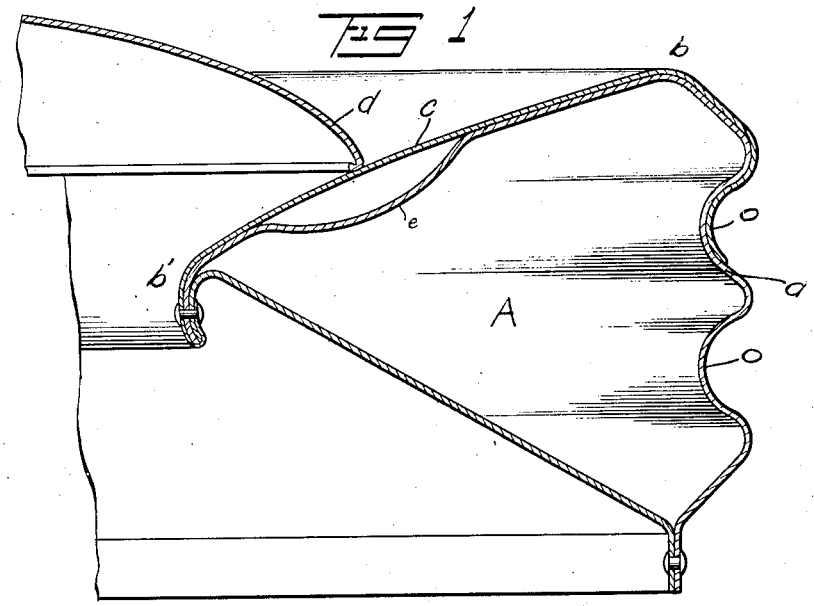
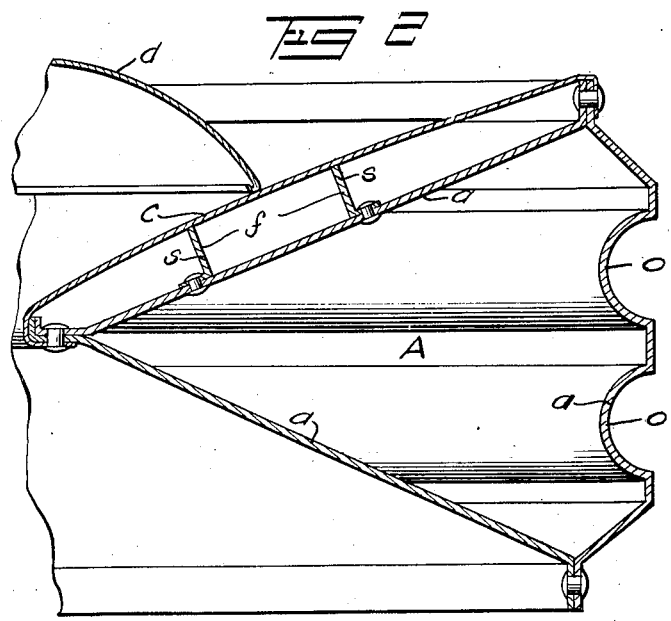
INVENTORS
Karl Stahl
Karl Siller
BY
ATTORNEYS Patented July 12, 1927.

1,635,195

UNITED STATES PATENT OFFICE.

KARL STAHL AND KARL SILLER, OF FRIEDRICHSHAFEN, GERMANY, ASSIGNORS TO LUFTSCHIFFBAU ZEPPELIN GESELLSCHAFT MIT BESCHRANKTER HAFTUNG, OF FRIEDRICHSHAFEN, GERMANY.

GAS VALVE FOR AIRSHIPS.

Application filed December 10, 1924, Serial No. 754,974, and in Germany December 24, 1923.

Our invention relates to gas valves, especially those used in airships. All the parts which are to be used for airship construction have to be as light as possible. This rule applies also to the valves which have to be provided for gas escape when a certain inner gas pressure is exceeded. On the other hand, the construction of such automatic valves should stand the usual strain. The valves now in use, for example, with the cells of rigid airships, will most likely be subjected to distortion as soon as it will become necessary to increase their size with the increasing capacity of the ships. Such distortion would cause leakage, but what is more important, in case of underpressure in the lower part of the gas cell, the non-tight valve would allow of air getting into the cell and fouling the gas. Our invention does away with these drawbacks by providing a light but strong construction of such valves.

The valve according to our invention consists of an annular seat made up of a membrane stretched so as to cooperate with a disc which is forced against the membrane, for example, by means of a spring. The gas pressure has to overcome the spring power to open the valve. According to our invention the structure serving for supporting the membrane is constructed as a ring-shaped boxlike body, thereby providing a very sturdy construction, safe against any possible distortion and yet light.

After having given a general description of our invention, we desire to point it out in detail, referring to the drawing in which two examples are given embodying our invention.

Figs. 1 and 2 are radial cross sections through gas valves both partly broken up.

In both figures, the letter A designates the hollow ring in cross section, which serves as a support for the membrane $c$. The walls $a$ of the ring box are connected in a suitable way, for example, they may be riveted together as shown in the drawing.

In Fig. 1 that part of the wall $a$ over which the membrane $c$ is stretched is curved in accordance with the shape which the membrane is likely to take when stretched. This same portion is provided with a groove $e$ extending as a ring over the entire surface of this wall portion, thereby leaving that part of the membrane $c$ unsupported, which stretches over the ring groove $e$. At this part of the membrane $c$ the disc $d$ is supposed to touch, thus securing a complete tightness of the valve.

In Fig. 2 the box wall $a$ on its outer surface is provided with two ring-shaped supports $s$ which enclose an annular gap $f$. Over this gap or groove $f$ which corresponds to the groove $e$ in Fig. 1, that part of the membrane $c$ is stretched which together with the disc $d$ provides for the tightness of the valve.

In both figures, outer ring grooves $o$ are shown which serve to provide for a tight connection between the valve and the sleeve of the gas cell (not represented) into which the valve fits.

For the purpose of lessening the weight of the valve, the walls $a$ of the ring shaped box A may have apertures (not shown) in such parts where gas tightness is not required.

We want it understood that we do not limit ourselves to the examples described or shown in the drawing, as many variations will occur to persons skilled in the art.

What we claim is:

1. A gas valve comprising a valve seat and a cover disc, said valve seat comprising a hollow ring and having a membrane stretched over it.

2. A gas valve comprising a hollow ring, a cover disc, a membrane stretched over said ring and means for providing an annular unsupported portion of said membrane, said portion cooperating with the edge of said cover disc and thereby rendering the valve tight.

3. A gas valve comprising a hollow ring, said hollow ring having an annular groove, a membrane stretched over said groove and a cover disc adapted to touch said membrane with the disc's edge at that portion where said membrane arches over said groove.

4. A ring-shaped box, the inner side of said box having substantially cone-like shape, a membrane stretched over said inner side of said box, said inner side having means for arching said membrane over a ringlike portion of said inner side, and a disc adapted to be pressed with its edges against said arched portion of said membrane.

KARL STAHL.
KARL SILLER.